United States Patent
Cho et al.

(10) Patent No.: US 11,537,135 B2
(45) Date of Patent: *Dec. 27, 2022

(54) MOVING ROBOT AND CONTROLLING METHOD FOR THE MOVING ROBOT

(71) Applicant: LG Electronics Inc., Seoul (KR)

(72) Inventors: Sungbeom Cho, Seoul (KR); Jaeheon Chung, Seoul (KR); Seaunglok Ham, Seoul (KR); Jinwoo Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 273 days.

This patent is subject to a terminal disclaimer.

(21) Appl. No.: 16/249,356

(22) Filed: Jan. 16, 2019

(65) Prior Publication Data
US 2019/0220033 A1 Jul. 18, 2019

(30) Foreign Application Priority Data

Jan. 17, 2018 (KR) .................. 10-2018-0006280

(51) Int. Cl.
*G05D 1/02* (2020.01)
*B25J 5/00* (2006.01)
(Continued)

(52) U.S. Cl.
CPC .......... *G05D 1/0225* (2013.01); *A47L 11/00* (2013.01); *B25J 5/007* (2013.01); *B25J 9/1697* (2013.01);
(Continued)

(58) Field of Classification Search
CPC .. G05D 1/0225; G05D 1/0088; G05D 1/0251; G05D 2201/0203;
(Continued)

(56) References Cited

U.S. PATENT DOCUMENTS

| 4,834,531 A * | 5/1989 | Ward | G01S 17/875 |
| | | | 244/172.4 |
| 2015/0115876 A1* | 4/2015 | Noh | H02J 7/0042 |
| | | | 320/107 |
| 2018/0246518 A1* | 8/2018 | Vogel | G05D 1/0274 |

FOREIGN PATENT DOCUMENTS

| CN | 202088202 U * | 12/2011 | ........... G05B 19/402 |
| EP | 3054361 A1 * | 8/2016 | ............ B25J 19/005 |

(Continued)

OTHER PUBLICATIONS

Machine translation of JP2016524214 (Year: 2016).*
(Continued)

*Primary Examiner* — Nicholas Kiswanto
*Assistant Examiner* — Mohamad O El Sayah
(74) *Attorney, Agent, or Firm* — Birch, Stewart, Kolasch & Birch, LLP

(57) ABSTRACT

A moving robot includes: a main body; a traveling unit configured to rotate and move the main body; a sensing unit configured to sense position information of a specific point of a front portion of a docking device; and a controller configured to, based on sensing result of the sensing unit, determine i) whether a first condition, which is preset to be satisfied when the docking device is disposed in a front of the moving robot, is satisfied, and ii) whether a second condition, which is preset to be satisfied when the moving robot is disposed in a front of the moving robot, is satisfied, to control an operation of the traveling unit so as to satisfy the first condition and the second condition, and to move to the front so as to attempt to dock in a state where the first condition and the second condition are satisfied.

11 Claims, 16 Drawing Sheets

(51) Int. Cl.
    *B25J 11/00*     (2006.01)
    *G05D 1/00*     (2006.01)
    *B25J 9/16*     (2006.01)
    *A47L 11/00*     (2006.01)
    *B60L 53/00*     (2019.01)

(52) U.S. Cl.
    CPC ........... *B25J 11/0085* (2013.01); *B60L 53/00* (2019.02); *G05D 1/0088* (2013.01); *G05D 1/0251* (2013.01); *G05D 2201/0203* (2013.01); *G05D 2201/0215* (2013.01)

(58) Field of Classification Search
    CPC .. G05D 2201/0215; B60L 53/00; B25J 5/007; B25J 9/1697; B25J 11/0085; A47L 11/00
    See application file for complete search history.

(56) References Cited

FOREIGN PATENT DOCUMENTS

| | | | | | |
|---|---|---|---|---|---|
| JP | 2005022040 | A | * | 1/2005 | |
| JP | 2016-524214 | | | 8/2016 | |
| JP | 2016524214 | A | * | 8/2016 | ........... G05D 1/0225 |
| KR | 20040063247 | A | * | 7/2004 | ........... A47L 9/2805 |
| KR | 10-0492538 | | | 6/2005 | |
| KR | 10-0645381 | | | 11/2006 | |
| KR | 100645381 | B1 | * | 11/2006 | ........... G05D 1/0242 |
| KR | 10-2010-0010962 | | | 2/2010 | |
| KR | 20100010962 | A | * | 2/2010 | ........... A47L 9/2873 |

OTHER PUBLICATIONS

Machine translation of CN202088202 (Year: 2011).*
Machine translation of KR20100010962 (Year: 2010).*
Machine translation of KR100645381 (Year: 2006).*
Machine translation of KR20040063247 (Year: 2004).*
Machine translation of JP-2005022040-A (Year: 2005).*

* cited by examiner

MOVING ROBOT AND CONTROLLING METHOD FOR THE MOVING ROBOT

BACKGROUND OF THE INVENTION

Field of the Invention

The present invention relates to a control technology for a docking of a moving robot.

Description of the Related Art

In general, robots have been developed for industrial use and have been part of factory automation. Recently, the application field of robots has been expanded, so that medical robots, aerospace robots, and the like have been developed and household robots that can be used in ordinary homes have been manufactured. Among these robots, a robot that can travel by itself is called a moving robot. A typical example of a moving robot used in home is a robot cleaner.

Such a moving robot is typically provided with a rechargeable battery, and provided with an obstacle sensor to avoid an obstacle during traveling so that the moving robot can travel by itself.

In recent years, the moving robots have been actively researched so as to be utilized in various fields such as health care, smart home, remote control, and the like, apart from merely autonomously traveling to perform cleaning.

Further, a docking device such as a charging stand for charging the moving robot is known. The moving robot returns to the docking device, when tasks such as cleaning is completed or when the charge amount of battery is a certain value or less, during traveling.

The related art (Korean Patent Laid-Open No. 10-2010-0136904) discloses an action algorithm that enables the docking device (docking station) to emit several types of docking induction signals in different ranges so as to divide surrounding area, and enables a robot cleaner to sense the docking induction signal to perform docking.

SUMMARY OF THE INVENTION

In the related art, there is a problem that a docking device searching based on a docking induction signal causes a docking failure phenomenon frequently due to the existence of dead angle, and there is a problem that the frequency of docking attempt is increased until the docking succeeds or the required time for the docking success is prolonged. A first object of the present invention is to solve such a problem.

A second object of the present invention is to significantly increase the success rate of docking.

A third object of the present invention is to enhance the efficiency of the operation for docking while achieving the above-mentioned problems.

In accordance with an aspect of the present invention, a moving robot includes: a main body; a traveling unit configured to rotate and move the main body; a sensing unit configured to sense position information of a specific point of a front portion of a docking device; and a controller configured to, based on sensing result of the sensing unit, determine i) whether a first condition, which is preset to be satisfied when the docking device is disposed in a front of the moving robot, is satisfied, and ii) whether a second condition, which is preset to be satisfied when the moving robot is disposed in a front of the moving robot, is satisfied, to control an operation of the traveling unit so as to satisfy the first condition and the second condition, and to move to the front so as to attempt to dock in a state where the first condition and the second condition are satisfied.

In accordance with another aspect of the present invention, a method of controlling a moving robot for an operation for docking to a docking device includes: a preparation operation step of determining, based on a result of position information of a specific point in a front portion of the docking device that the moving robot sensed, i) whether it satisfies a first condition which is preset to be satisfied when the docking device is disposed in a front of the moving robot, and ii) whether it satisfies a second condition which is preset to be satisfied when the moving robot is disposed in a front of the docking device; and a docking operation step of moving to the front and attempting to dock, by the moving robot, in a state where the first condition and the second condition are satisfied.

It is determined whether the second condition is satisfied in a state where the first condition is satisfied.

A first angle between a front direction of the moving robot and a disposition direction of the docking device with respect to the moving robot is calculated, and it is determined whether the first condition is satisfied based on the first angle.

A second angle between a front direction of the docking device and a disposition direction of the moving robot with respect to the docking device is calculated, and it is determined whether the second condition is satisfied based on the second angle.

The first condition is preset to a condition that the first angle is equal to or less than a certain first reference value or the first angle is less than a certain first reference value.

The second condition is preset to a condition that the second angle is equal to or less than a certain second reference value or the second angle is less than a certain second reference value.

The sensing unit includes: a light irradiation unit for irradiating a certain light; and a 3D camera for sensing the light reflected from the specific point.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE PREFERRED EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

A moving robot 100 according to the present invention means a robot that can move by itself using wheels, or the like, and may be a home helper robot, a robot cleaner, and the like. Hereinafter, a robot cleaner 100 will be described as an example of the moving robot with reference to FIGS. 1 to 6, but the present invention is not limited thereto.

Figure 1:
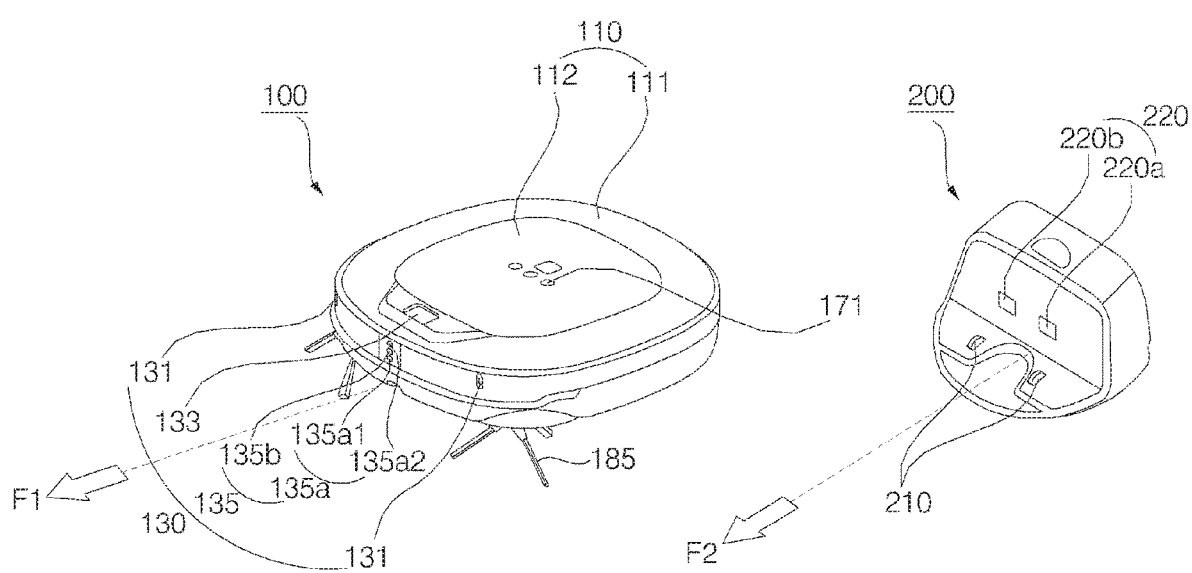
FIG. 1 is a perspective view illustrating a moving robot 100 and a docking device 200 according to an embodiment of the present invention.
Figure 2:
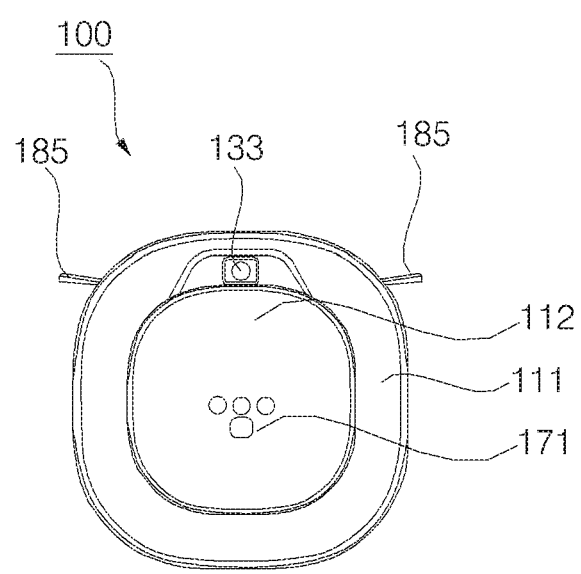
FIG. 2 is an elevation view of the moving robot 100 of FIG. 1 viewed from above.
Figure 3:
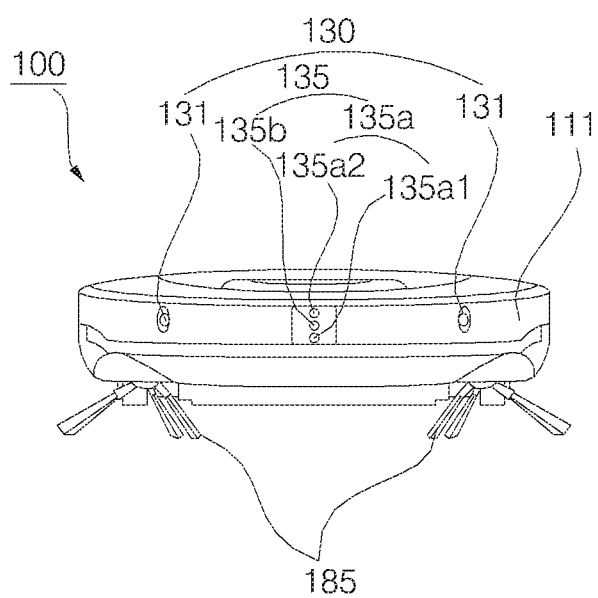
FIG. 3 is an elevation view of the moving robot 100 of FIG. 1 viewed from the front.
Figure 4:
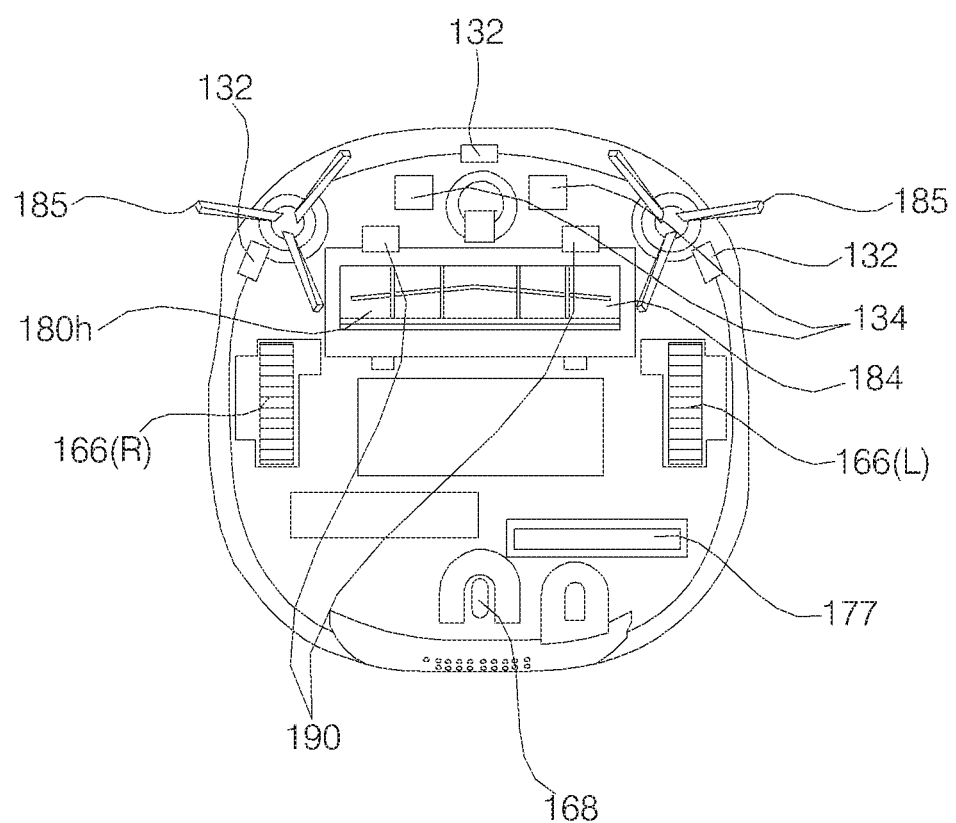
FIG. 4 is an elevation view seen from the lower side of the moving robot 100 of FIG. 1.
Figure 5:
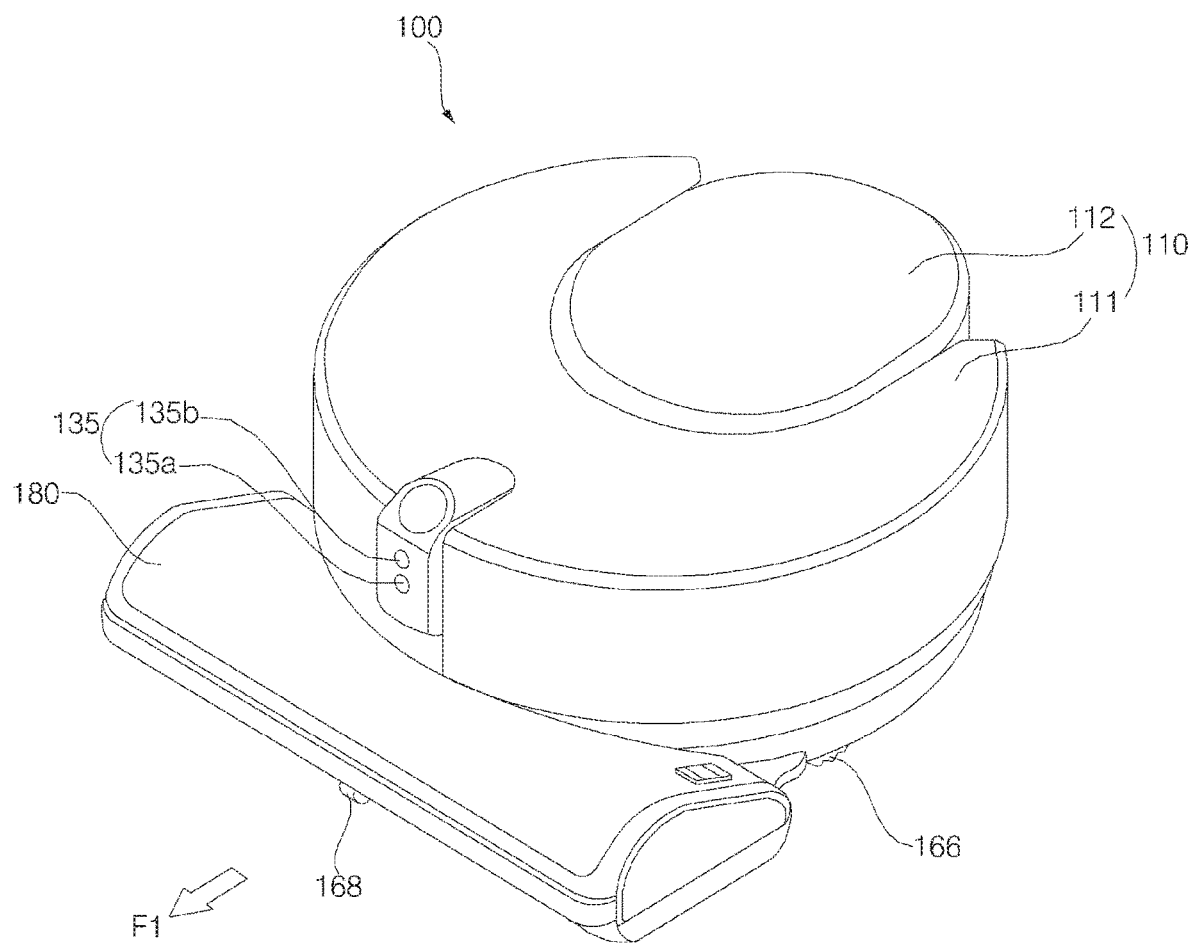
FIG. 5 is a perspective view illustrating a moving robot 100 according to another embodiment of the present invention.

Referring to FIG. 1 and FIG. 5, a front direction F1 of the moving robot 100 is defined as an approaching direction F1 of the moving robot 100 for achieving a docking, and each direction of the moving robot 100 is defined based on the front direction F1. In addition, a front direction F2 of a docking device 200 is defined as the opposite direction F2 of the approaching direction F1 when the moving robot 100 is docked, and each direction of the docking device 200 is defined based on the front direction F2. The definition of each direction including the above mentioned directions F1 and F2 is for illustrative purposes only, and it is obvious that the directions can be defined differently depending on where a reference is placed.

Referring to FIG. 1 to FIG. 5, the moving robot 100 includes a main body 110. Hereinafter, when defining each part of the main body 110, a portion facing a ceiling in a traveling area is defined as an upper surface portion (see FIG. 2), a portion facing a bottom in the traveling area is defined as a bottom surface portion (see FIG. 4), and a portion facing the front direction F1 among a portion surrounding the body 110 between the upper surface portion and the bottom surface portion is defined as a front portion (see FIG. 3). Further, a portion facing the opposite direction of the front portion of the main body 110 may be defined as a rear portion.

The main body 110 may include a case 111 forming a space in which various components constituting the moving robot 100 are accommodated. The moving robot 100 includes a sensing unit 130 that senses information related to the moving robot 100 or surrounding environment. The moving robot 100 includes a traveling unit 160 that rotates and moves the main body 110. The moving robot 100 includes a work unit 180 that performs a certain task during traveling. The moving robot 100 includes a controller 140 for controlling the moving robot 100.

Referring to FIG. 1 to FIG. 5, the sensing unit 130 may perform sensing during traveling. Due to the sensing of the sensing unit 130, information on the sensing result of the sensing unit 130 is generated. The sensing unit 130 may sense the surroundings of the moving robot 100. The sensing unit 130 may sense the state of the moving robot 100.

The sensing unit 130 may sense information on a traveling area. The sensing unit 130 may sense obstacles such as wall, furniture, and cliff on a traveling surface. The sensing unit 130 may sense information on a ceiling. The moving robot 100 may map the traveling area through information sensed by the sensing unit 130.

The sensing unit 130 senses information on the docking device 200. The sensing unit 130 may sense position information of the docking device 200.

The sensing unit 130 may sense position information of specific point(s) of the front portion of the docking device 200. Here, the position information of the specific point may include relative position information of the specific point with respect to the moving robot 100, and/or coordinate information within an image corresponding to the specific point. Here, the relative position information of the specific point with respect to the moving robot 100 may be three-dimensional coordinate information, or two-dimensional coordinate information on a plane parallel to the traveling surface.

The position information of the specific point may be acquired directly by the sensing of the sensing unit 130, or may be acquired after being processed by the controller 140 or a server. For example, coordinate information of the specific point may be directly acquired through a 3D sensor 135. Alternatively, the controller may convert information sensed through an ultrasonic sensor to acquire the coordinate information.

The sensing unit 130 may include at least one of a distance sensing unit 131, a cliff sensing unit 132, an external signal sensing unit (not shown), a shock sensing unit (not shown), an upper image sensor 133, a lower image sensor 134, a 3D sensor 135, and a docking sensing unit.

The sensing unit 130 may include the distance sensing unit 131 for sensing a distance to a surrounding object. The distance sensing unit 131 may be disposed on the front surface of the main body 110 or may be disposed on the side surface of the main body 110. The distance sensing unit 131 may sense a surround obstacle. A plurality of distance sensing units 131 may be provided.

For example, the distance sensing unit 131 may be an infrared ray sensor having a light emitting unit and a light receiving unit, an ultrasonic sensor, an RF sensor, a geomagnetic sensor, and the like. The distance sensing unit 131 may be implemented by using an ultrasonic wave or an infrared ray. The distance sensing unit 131 may be implemented by using a camera. The distance sensing unit 131 may be implemented by two or more types of sensors.

For example, the distance information may be acquired by the sensing of the distance sensing unit 131. The moving robot 100 may acquire distance information between the moving robot 100 and the docking device 200 through reflection of infrared rays or ultrasonic waves.

As another example, the distance information may be measured with a distance between any two points on a map. The moving robot 100 may recognize the position of the docking device 200 and the position of the moving robot 100 on the map, and may acquire distance information between the docking device 200 and the moving robot 100 by using a difference of coordinate on the map.

The sensing unit 130 may include the cliff sensing unit 132 for sensing an obstacle on the floor of the traveling area. The cliff sensing unit 132 may sense the presence of a cliff on the floor.

The cliff sensing unit 132 may be disposed on the bottom surface of the moving robot 100. A plurality of cliff sensing units 132 may be provided. The cliff sensing unit 132 disposed in a front portion of the bottom of the moving robot 100 may be provided. The cliff sensing unit 132 disposed in a rear portion of the bottom of the moving robot 100 may be provided.

The cliff sensing unit 132 may be an infrared ray sensor having a light emitting unit and a light receiving unit, an ultrasonic sensor, a RF sensor, a position sensitive detector (PSD) sensor, and the like. For example, the cliff sensing sensor may be a PSD sensor, but it may be formed of a plurality of different types of sensors. The PSD sensor includes a light emitting unit for emitting infrared light to the obstacle and a light receiving unit for receiving infrared light reflected from the obstacle.

The cliff sensing unit 132 may sense the presence of a cliff and the depth of the cliff.

The sensing unit 130 may include the shock sensing unit that senses the shock of the moving robot 100 due to a contact with an external object.

The sensing unit 130 may include the external signal sensing unit that senses a signal transmitted from the outside of the moving robot 100. The external signal sensing unit may include at least one of an infrared ray sensor that senses an infrared signal from the outside, an ultrasonic sensor that senses an ultrasonic signal from the outside, and a radio frequency (RF) sensor that senses an RF signal from the outside.

The moving robot 100 may receive a guidance signal generated by the docking device 200 using the external signal sensing unit. The external signal sensing unit may sense the guidance signal (e.g., an infrared signal, an ultrasonic signal, a RF signal) of the docking device 200, and generate information on the relative position of the moving robot 100 and the docking device 200. The docking device 200 may transmit the guidance signal indicating a direction and a distance of the docking device 200. The moving robot 100 may receive the signal transmitted from the docking device 200, and move to attempt to dock to the docking device 200.

The sensing unit 130 may include an image sensing unit 133, 134, 135*b* for sensing an image outside the moving robot 100.

The image sensing unit 133, 134, 135*b* may include a digital camera. The digital camera may include at least one optical lens, an image sensor (e.g., a CMOS image sensor) having a plurality of photodiodes (e.g., pixels) that form an image by light passed through the optical lens, and a digital signal processor (DSP) for constituting an image based on a signal outputted from the photodiodes. The digital signal processor may generate a moving image formed of frames composed of still images, as well as a still image.

The image sensing unit 133, 134, 135*b* may include the 3D camera 135*b* that senses a forward image of the moving robot 100. The 3D camera 135*b* may sense an image of a surrounding object such as the obstacle, the docking device 200, or sense a reflected light of infrared rays radiated forward.

The image sensing unit 133, 134, and 135*b* may include an upper image sensor 133 that senses an image in an upward direction of the moving robot 100. The upper image sensor 133 may sense an image of a ceiling or a lower side of the furniture disposed in the upper side of the moving robot 100.

The image sensing unit 133, 134, 135*b* may include a lower image sensor 134 that senses an image in a downward direction of the moving robot 100. The lower image sensor 134 may sense an image of the floor.

In addition, the image sensing unit 133, 134, 135*b* may include a sensor for sensing an image in a side direction or rear direction.

The sensing unit 130 may include the 3D sensor 135 for sensing position information of an external environment.

In the present embodiment, the 3D sensor 135 includes a light irradiation unit 135*a* for irradiating a certain light. The light irradiation unit 135*a* irradiates the light to the front of the main body 110. The light irradiated by the light irradiation unit 135*a* may include Infra-Red (IR) ray.

In the present embodiment, the 3D sensor 135 includes a 3D camera (3D Depth Camera) 135*b* for sensing the light of the light irradiation unit 135*a* reflected by an external object. The 3D camera 135*b* senses the light reflected from the specific point of the docking device 200. The 3D camera 135*b* may sense a front image of the main body 110 or a reflected light.

In the present embodiment, the light irradiation unit 135*a* and the 3D camera 135*b* may be used to sense position information of specific point(s) of the front portion of the docking device 200.

Referring to FIG. 1 to FIG. 4, the 3D camera 135*b* of the 3D sensor 135 according to a first embodiment is an IR camera that senses IR (infrared ray) and acquires coordinate information of any one point of an external environment.

In the first embodiment, the light irradiation unit 135*a* may be provided to irradiate an infrared ray pattern. In this case, the 3D camera 135*b* may capture a shape of the infrared ray pattern projected on an object to be photographed, thereby sensing a distance between the 3D sensor 135 and the object to be photographed.

The light irradiation unit 135*a* of the 3D sensor 135 according to the first embodiment may include a first pattern light irradiation unit 135*a*1 for irradiating light of a first pattern to the front of the main body 110, and a second pattern light irradiation unit 135*a*2 for irradiating light of a second pattern to the front of the main body 110. The 3D camera 135*b* may acquire an image of the area to which the light of the first pattern and the light of the second pattern are inputted. For example, the light of the first pattern and the light of the second pattern may be irradiated in a linear shape intersecting with each other, or may be irradiated in a horizontal straight line spaced up and down.

Figure 11A:
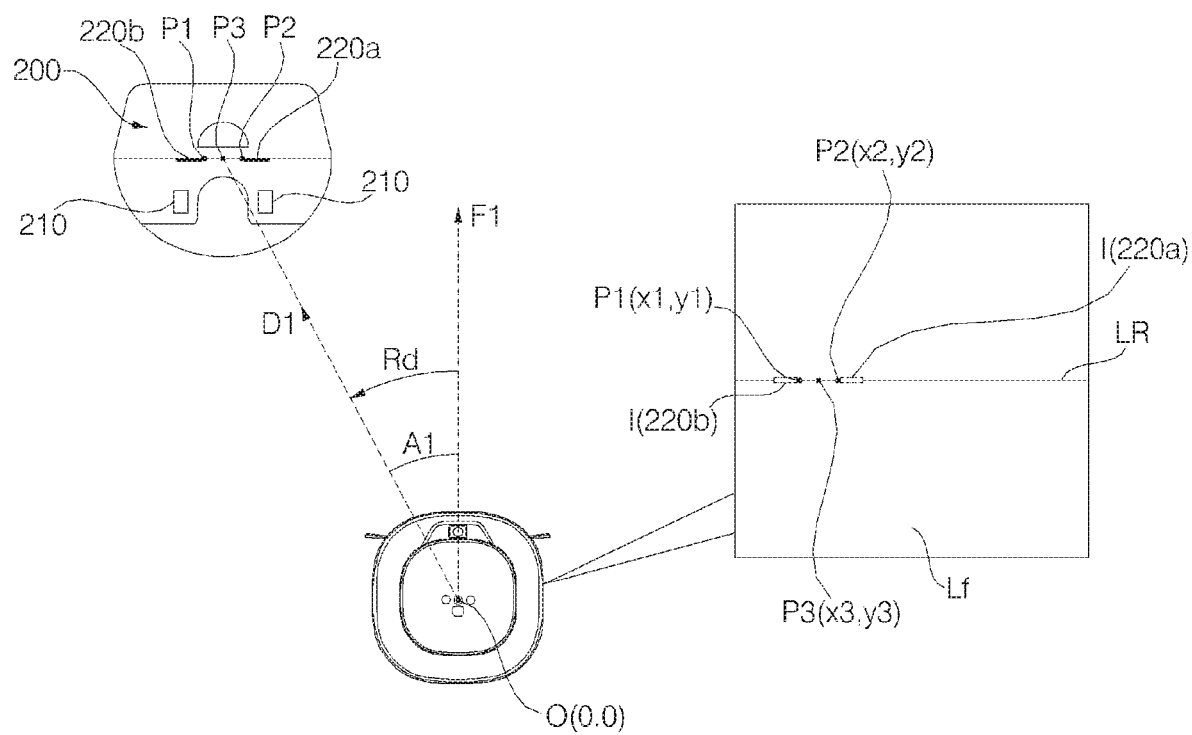
FIG. 11A to FIG. 11C are diagrams illustrating a continuous state in which a moving robot 100 is controlled according to a first embodiment, and illustrating an elevation view of the moving robot 100 and a docking device 200 viewed from above, and an image photographed by a 3D camera 135b of the moving robot 100.
Figure 11B:
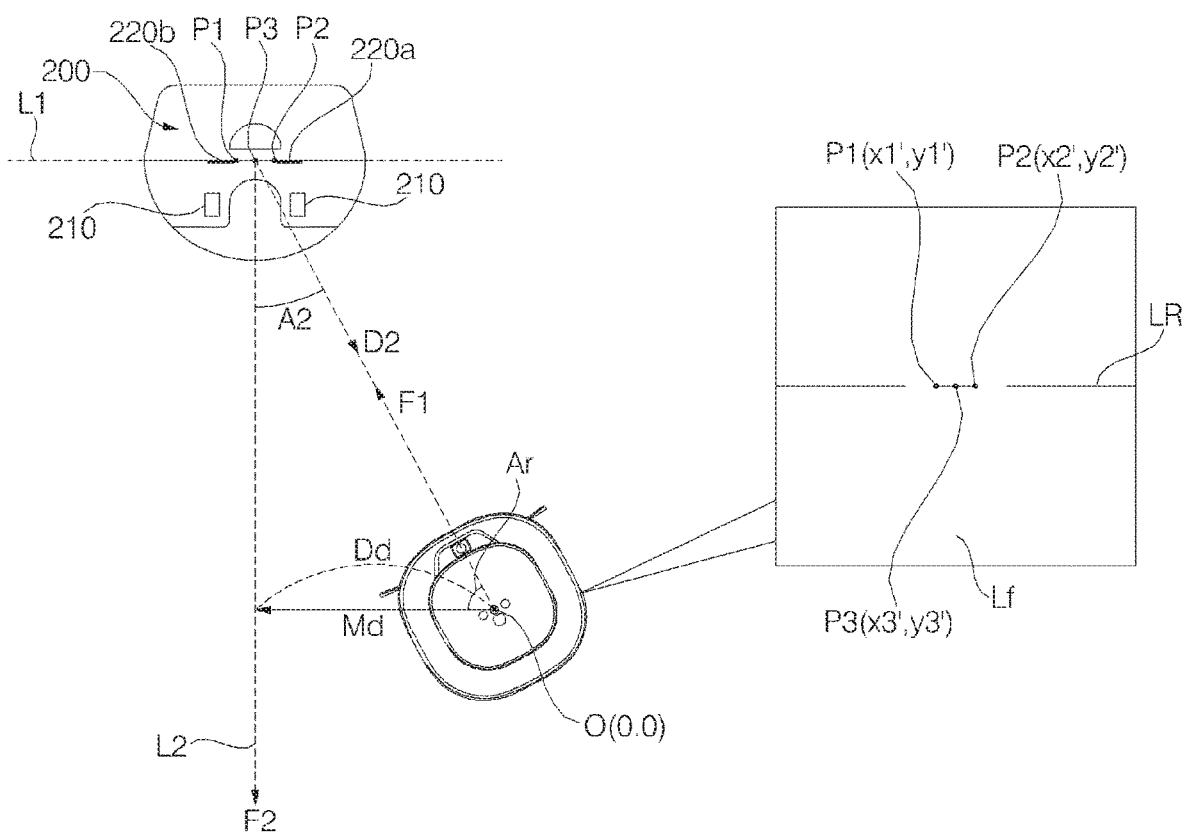
Figure 11C:
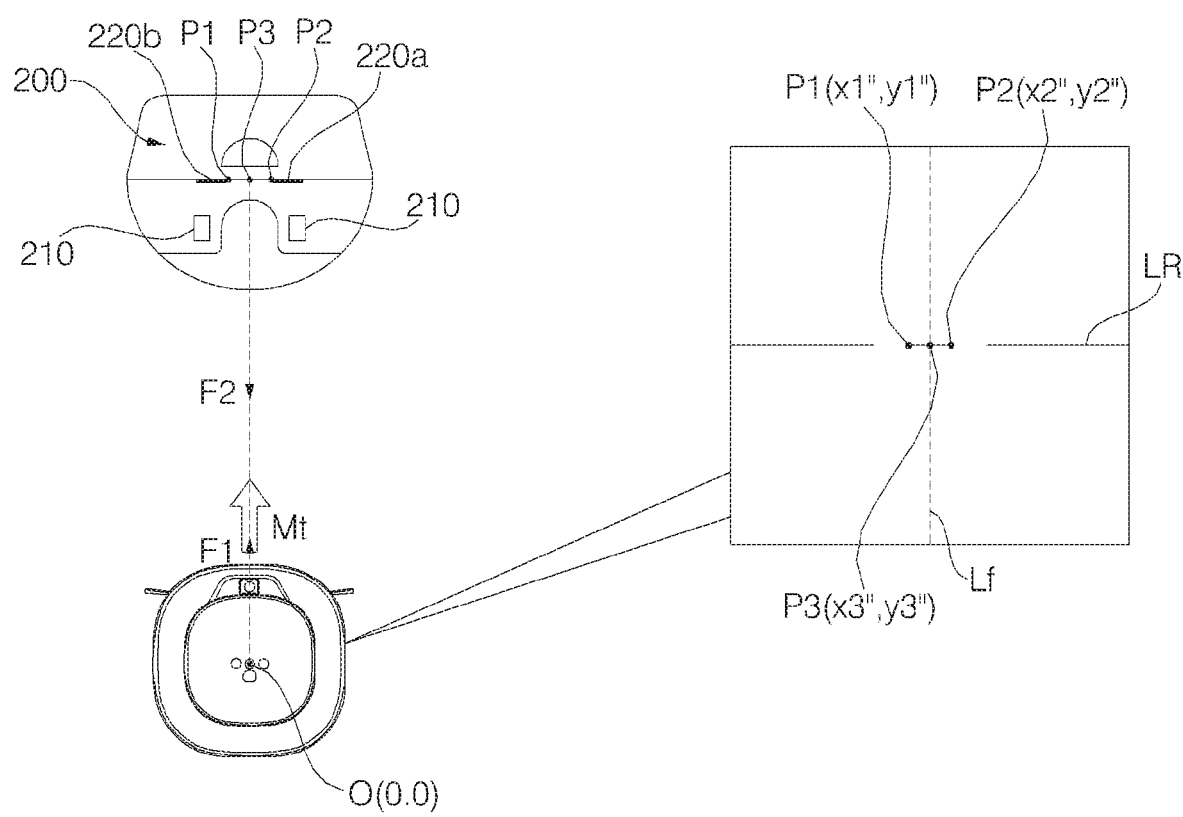

In the first embodiment, at least one pattern light irradiation unit 135*a*1 may irradiate a pattern light having a horizontal straight line shape forward. Referring to FIGS. 11A to 11C, when the pattern light of the light irradiation unit 135*a*1 is reflected in a linear area horizontally traversing the specific point of the docking device 200, the 3D camera 135*b* may detect such a reflected light LR, and sense the position information of the docking device 200 with respect to the specific point P1, P2, P3. Thus, coordinate information of the specific point P1, P2, P3 may be generated.

Referring to FIG. 5, the 3D camera 135*b* of the 3D sensor 135 according to the second embodiment is an RGB-Depth camera that senses an image of an external object and senses Infrared ray IR) to acquire coordinate information of any one point in an external environment.

In the second embodiment, the light irradiation unit 135*a* may be provided to have an irradiation angle in the left-right direction and a vertical direction toward the front. A single light irradiation unit 135*a* may be provided. In this case, the 3D camera 135*b* may sense that the light irradiated from the light irradiation unit 135*a* is reflected and received, and calculate the distance between the 3D sensor 135 and the object to be photographed. The 3D sensor 135 may be implemented in a Time of Flight (TOF) scheme.

Figure 12A:
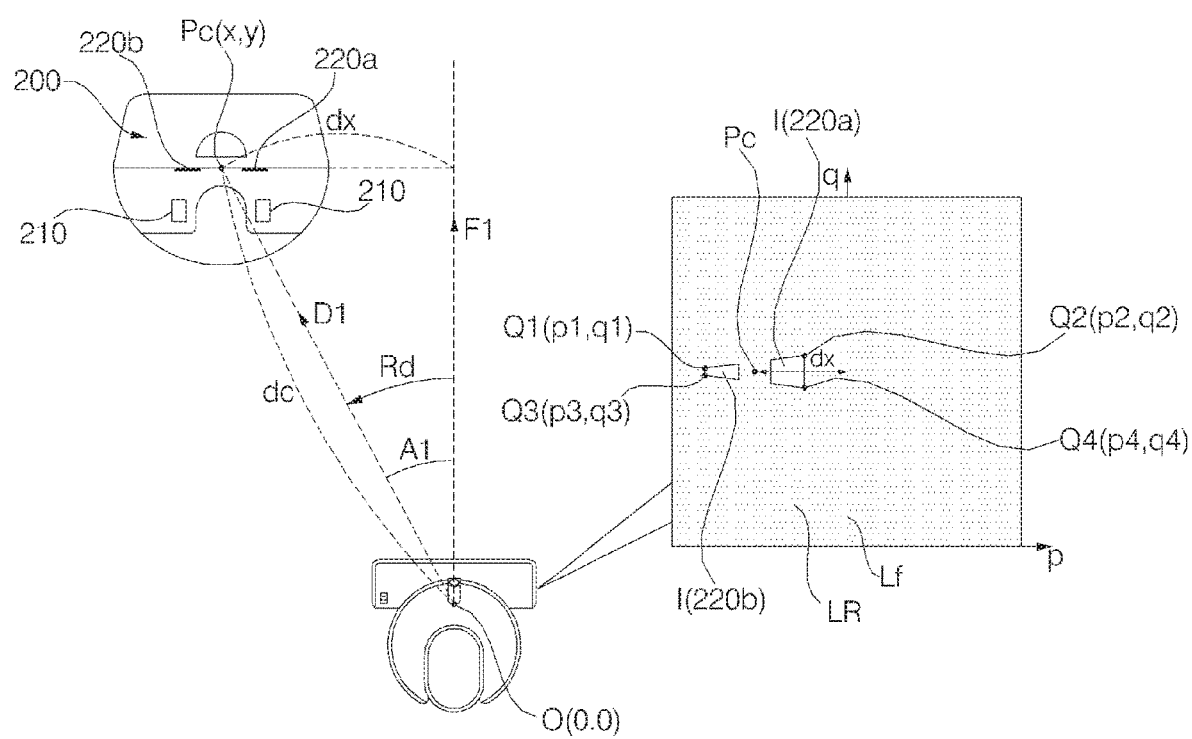
FIG. 12A to FIG. 12C are diagrams illustrating a continuous state in which a moving robot 100 is controlled according to a second embodiment, and illustrating an elevation view of the moving robot 100 and a docking device 200 viewed from above, and an image photographed by a 3D camera 135b of the moving robot 100.
Figure 12B:
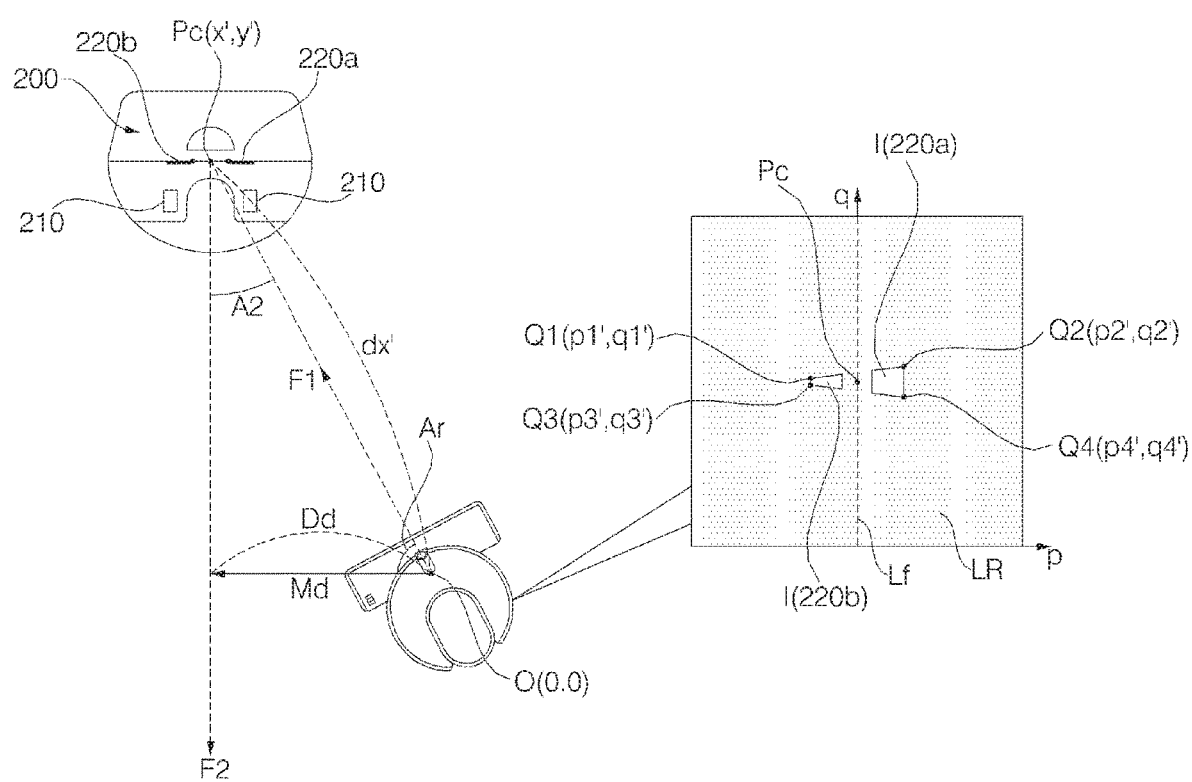
Figure 12C:
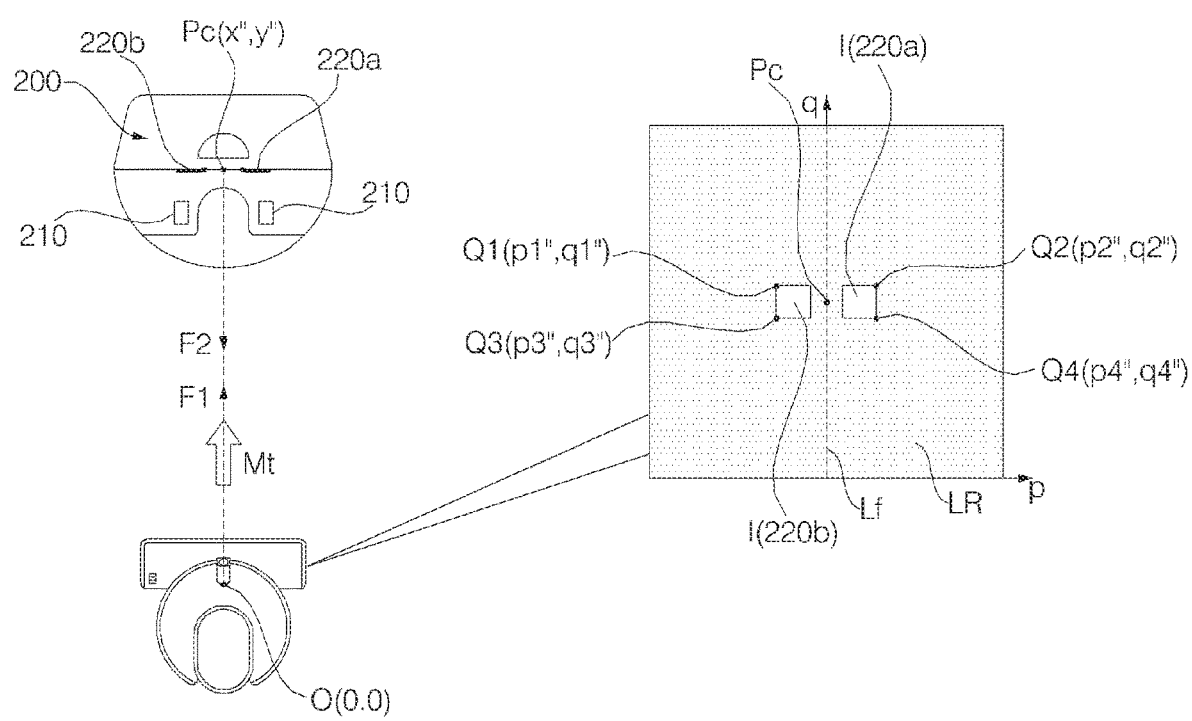

In the second embodiment, the light irradiation unit 135*a* may irradiate light having the irradiation angle. Referring to FIGS. 12A to 12C, when the light of the light irradiation unit 135*a* is reflected in an area including the specific point of the docking device 200, the 3D camera 135*b* may detect the reflected light LR, and sense the position information on the specific point Pc, Q1, Q2, Q3, Q4. Thus, the coordinate information of the specific point Pc, Q1, Q2, Q3, Q4 may be generated.

Although not shown, in another embodiment, the 3D sensor may be formed in a stereovision scheme such that the 3D sensor includes two or more cameras that acquire two-dimensional image, and combines two or more images acquired from the two or more cameras to generate three-dimensional information. Thus, the position information of the specific point on the front surface of the docking device 200 may be sensed.

The sensing unit 130 may include a docking sensing unit (not shown) for sensing whether the moving robot 100 has succeeded in docking to the docking device 200. The docking sensing unit may be implemented to be sensed by the contact of a corresponding terminal 190 and a charging terminal 210, may be implemented by a sensor disposed separately from the corresponding terminal 190, or may be implemented by sensing the charging state of a battery 177. The docking sensing unit may sense the docking success state and the docking failure state.

Referring to FIGS. 1 to 5, the traveling unit 160 moves the main body 110 with respect to the floor. The traveling unit 160 may include at least one driving wheel 166 for moving the main body 110. The traveling unit 160 may include a driving motor. The driving wheel 166 may include a left wheel 166(L) and a right wheel 166(R) which are provided in the left and right sides of the main body 110 respectively.

The left wheel 166(L) and the right wheel 166(R) may be driven by a single drive motor. However, if necessary, a left wheel drive motor for driving the left wheel 166(L) and a right wheel drive motor for driving the right wheel 166(R) may be provided respectively. The traveling direction of the main body 110 may be changed to the left or right side by making a difference in rotational speed between the left wheel 166(L) and the right wheel 166(R).

The traveling unit 160 may include a sub-wheel 168 that does not provide a separate driving force, but subsidiarily supports the main body with respect to the floor.

The moving robot 100 includes a work unit 180 that performs a certain task.

For example, the work unit 180 may be provided to perform a housework operation such as cleaning (sweeping, suction cleaning, mopping, etc.), washing-up, cooking, laundry, garbage disposal, and the like. As another example, the work unit 180 may be provided to perform an operation such as manufacturing or repairing of an apparatus. As another example, the work unit 180 may perform an operation such as finding an object or removing a worm. In the present embodiment, it is described that the work unit 180 performs cleaning work. However, the types of work of the work unit 180 may have various examples, and are not limited to the example of the present description.

The moving robot 100 may move in the traveling area and may clean the floor by the work unit 180. The work unit 180 may include a suction device for sucking foreign substances, a brush 184, 185 for performing a sweeping, a dust container (not shown) for storing foreign substances collected by the suction device or the brush and/or a wiping unit (not shown) for performing a wiping, and the like.

A suction port 180*h* through which air is sucked may be formed in the bottom of the main body 110. A suction device (not shown) for supplying a suction force for sucking air through the suction port 180*h*, and a dust container (not shown) for collecting the dust together with the air sucked through the suction port 180*h* may be provided inside the main body 110.

The case 111 may have an opening for insertion and removal of the dust container, and a dust container cover 112 for opening and closing the opening may be rotatably provided with respect to the case 111.

The work unit 180 may include a main brush 184 of a roll type having brushes exposed through the suction port 180*h*, and an auxiliary brush 185 positioned on the front side of the bottom surface of the main body 110 and having a brush formed of a plurality of radially extending feathers. Due to the rotation of the brushes 184 and 185, the dusts are removed from the floor in the traveling area, and the dusts separated from the floor are sucked through the suction port 180*h* and collected in the dust container.

Referring to FIGS. 1 to 5, the moving robot 100 includes a corresponding terminal 190 for charging the battery 177 when docking to the docking device 200. The corresponding terminal 190 is disposed in a position where the moving robot 100 is able to be connected to the charging terminal 210 of the docking device 200 in a state where the moving robot 100 is docked successfully. In the present embodiment, a pair of corresponding terminals 190 are disposed on the bottom surface portion of the main body 110.

Figure 6:
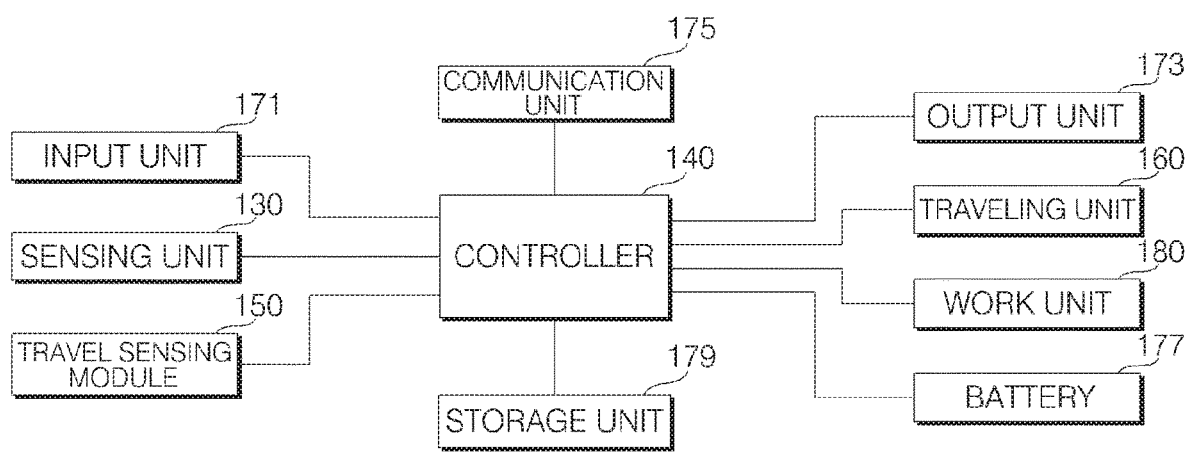
FIG. 6 is a control block diagram of the moving robot 100 of FIG. 1 and FIG. 5.

Referring to FIG. 6, the moving robot 100 may include a travel sensing module 150 for sensing the behavior of the moving robot 100. The travel sensing module 150 may sense the behavior of the moving robot 100 by the travel unit 160.

The travel sensing module 150 may include an encoder (not shown) for sensing a moving distance of the moving robot 100. The travel sensing module 150 may include an acceleration sensor (not shown) for sensing the acceleration of the moving robot 100. The travel sensing module 150 may include a gyro sensor (not shown) for sensing the rotation of the moving robot 100.

Through the sensing of the travel sensing module 150, the controller 140 may acquire information on the movement path of the moving robot 100. For example, based on the rotation speed of the driving wheel 166 sensed by the encoder, information on the current or past moving speed of the moving robot 100, the traveled distance, and the like may be acquired. For example, information on a current or past redirection process may be acquired according to the rotation direction of each driving wheel 166(L), 166(R).

The moving robot 100 may include an input unit 171 for inputting information. The input unit 171 may receive on/off or various commands. The input unit 171 may include a button, a key, a touch-type display, and the like. The input unit 171 may include a microphone for voice recognition.

The moving robot 100 may include an output unit 173 for outputting information. The output unit 173 may inform a user of various types of information. The output unit 173 may include a speaker and/or a display.

The moving robot 100 may include a communication unit 175 for transmitting/receiving information to/from other external device. The communication unit 175 may be connected to a terminal device and/or other devices positioned in a specific area through one of a wired, wireless, and satellite communication methods to transmit and receive data.

The communication unit 175 may be provided to communicate with other device such as a terminal, a wireless router, and/or a server. The communication unit 175 may receive various command signals from an external device such as a terminal. The communication unit 175 may transmit information to be outputted to an external device such as a terminal. The terminal may output the information received from the communication unit 175.

For example, the communication unit 175 may be configured to achieve a wirelessly communication by using a wireless communication technology such as IEEE 802.11 WLAN, IEEE 802.15 WPAN, UWB, Wi-Fi, Zigbee, Z-wave, Blue-Tooth, and the like. The communication unit 175 may be changed depending on a communication method of other device or a server to communicate with.

The moving robot 100 includes the battery 177 for supplying driving power to respective components. The battery 177 supplies power for the moving robot 100 to perform behavior according to the selected behavior information. The battery 177 is mounted in the main body 110. The battery 177 may be detachably provided in the main body 110.

The battery 177 is provided to be chargeable. The moving robot 100 may be docked to the docking device 200 and the battery 177 may be charged through the connection of the charging terminal 210 and the corresponding terminal 190. When the charge amount of the battery 177 becomes a certain value or less, the moving robot 100 may start a docking mode for charging. In the docking mode, the moving robot 100 travels to return to the docking device 200, and the moving robot 100 may sense the position of the docking device 200 during the return travel of the moving robot 100.

The moving robot 100 includes a storage unit 179 for storing various types of information. The storage unit 179 may include a volatile or nonvolatile recording medium.

The storage unit 179 may store position information of the specific point. The storage unit 179 may store an algorithm for controlling the rotation and/or movement of the moving robot 100.

The storage unit 179 may store a map of the traveling area. The map may be inputted by an external terminal capable of exchanging information with the moving robot 100 through the communication unit 175, or may be generated as the moving robot 100 learns by self. In the former case, the external terminal 300a may be a remote controller, a PDA, a laptop, a smart phone, a tablet PC, and the like in which an application for setting a map is installed.

Referring to FIG. 1, the docking device 200 includes the charging terminal 210 to be connected to the corresponding terminal 190 in a docking success state of the moving robot 100. The docking device 200 may include a signal transmitting unit (not shown) for transmitting the guidance signal. The docking device 200 may be disposed on the floor.

A portion facing the front direction F2 is defined as a front portion of the docking device 200. A marker 220 may be disposed in the front side of the docking device 200 so as to set the specific point to the front portion of the docking device 200. The surface of the marker 220 may be provided to have a higher light reflectance than other portion of the front portion of the docking device 200.

Since the marker 220 has a high reflectance, the brightness of an area in which the marker 220 is disposed in the image acquired by the 3D camera 135b is significantly increased. The position information of the specific point may be sensed by setting a boundary point of the area where the marker 220 is disposed in the image of the 3D camera 135b to the specific point.

The marker 220 may include two portions 220a and 220b that are spaced apart from each other. In the present embodiment, the marker 220 may include a first portion 220a disposed in the left side of the docking device 200 and a second portion 220b disposed in the right side of the docking device 200. The first portion 220a and the second portion 220b may be formed in a square shape respectively when viewed from the front. The front shape of the first portion 220a may be a rectangle having sides extending in the left-right direction and the vertical direction. The front shape of the second portion 220b may be a rectangle having sides extending in the left-right direction and the vertical direction.

The marker 220 may be disposed in a center of the front portion of the docking device 200 in the left-right direction. The center of the marker 220 in the left-right direction may be disposed in the center in the left-right direction of the front portion of the docking device 200. The center of the marker 220 in the left-right direction may be disposed in the center of the front portion of the docking device 200 in the left-right direction. The center of the marker 220 in the left-right direction may be disposed in the center of a disposition area in the left-right direction when the moving robot 100 is docked in the docking device 20. The marker 220 may be formed symmetrically.

Referring again to FIG. 6, the moving robot 100 includes the controller 140 for processing and determining various types of information, such as mapping and/or recognizing a current position. The controller 140 may control the overall operation of the moving robot 100 through control of various components of the moving robot 100. The controller 140 may be provided to map the traveling area through the image and recognize the current position on the map. That is, the controller 140 may perform a simultaneous localization and mapping (SLAM) function.

The controller 140 may receive information from the input unit 171 and process the received information. The controller 140 may receive information from the communication unit 175 and process the received information. The controller 140 may receive information from the sensing unit 130 and process the received information.

The controller 140 may control the communication unit 175 to transmit information. The controller 140 may control the output of the output unit 173. The controller 140 may control the driving of the traveling unit 160. The controller 140 may control the operation of the work unit 180.

Based on the result sensed by the sensing unit 130, the controller 140 may determine i) whether it satisfies a first condition that is previously set to be satisfied when the docking device 200 is disposed in the front F1 of the moving robot 100, and ii) whether it satisfies a second condition that is previously set to be satisfied when the moving robot 100 is disposed in the front F2 of the docking device 200. The controller 140 may control the operation of the traveling unit 160 so that the first condition and the second condition are satisfied. Specifically, the controller 140 may control the operation of the traveling unit 160 so that the moving robot 100 may perform a rotation operation and/or a movement operation.

The controller 140 may control the moving robot 100 to move to the front F1 and attempt to dock in a state where the first condition and the second condition are satisfied.

Referring to FIGS. 11A and 12A, the controller 140 may calculate a first angle A1 between the front direction F1 of the moving robot 100 and the disposition direction D1 of the docking device 200 with respect to the moving robot 100. The controller 140 may determine whether the first condition is satisfied based on the first angle A1. When it is determined that the first condition is not satisfied, the controller 140 may control the moving robot 100 to rotate in the rotation direction Rd in which the first angle A1 is decreased. In this case, the controller 140 may control the moving robot 100 to rotate by the first angle A1 in the rotation direction Rd.

Referring to FIGS. 11B and 12B, the controller 140 may calculate a second angle A2 between the front direction F2 of the docking device 200 and the disposition direction D2 of the moving robot 100 with respect to the docking device 200. The controller 140 may determine whether the second condition is satisfied based on the second angle A2. When it is determined that the second condition is not satisfied, the controller 140 may control the moving robot 100 to move in a moving direction Md in which the second angle A2 is decreased. In this case, the controller 140 may control the moving robot 100 to move by a second distance Dd calculated according to a certain algorithm in the moving direction Md.

It is preferable that the controller 140 determines whether the second condition is satisfied in a state in which the first condition is satisfied. The second angle may be calculated more easily and accurately in a state where the docking device 200 is disposed in the front direction F1 of the moving robot 100.

Hereinafter, a method of controlling the moving robot according to the embodiments of the present invention will be described with reference to FIGS. 7 to 12C. The control method is a method of controlling an operation of the moving robot 100 for docking to the docking device 200.

The control method may be performed only by the controller 140, or may be performed by an external device such as the controller 140, and a server, according to an embodiment. The present invention may be a computer program implementing each step of the control method, or may be a recording medium on which a program for implementing the control method is recorded. The 'recording medium' means a computer-readable recording medium. The present invention may be a system including both hardware and software.

In some embodiments, it is also possible that the functions mentioned in the steps may be generated out of order. For example, the two steps shown in succession may be performed substantially concurrently, or the steps may sometimes be performed in reverse order according to a corresponding function.

Figure 7:
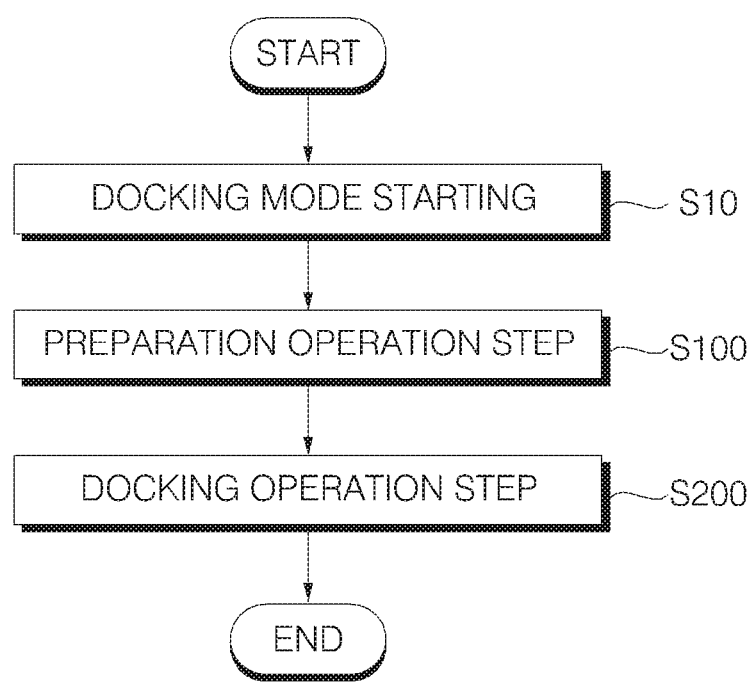
FIG. 7 is a flowchart illustrating a control method of a moving robot 100 according to an embodiment of the present invention.

Referring to FIG. 7, the control method may include a docking mode starting step S10. In the docking mode starting step S10, the moving robot 100 may start an operation for docking to the docking device 200. For example, when the battery 177 of the moving robot 100 becomes a certain value or less, or when the moving robot 100 completes a certain task, the docking mode starting step S10 may be performed.

After the docking mode starting step S10, the control method may include a preparation operation step S100 before the entry operation for docking, and a docking operation step S200 for entry operation for docking.

In the preparation operation step S100, the moving robot 100 may operate based on the result of sensing the position information of a specific point of the front portion of the docking device 200 by the moving robot 100. In the preparation operation step S100, based on the position information of the specific point, it is determined whether it satisfies a first condition which is previously set to be satisfied when the docking device 200 is disposed in the front F1 of the moving robot 100. In the preparation operation step S100, based on the position information of the specific point, it is determined whether it satisfies a second condition which is previously set to be satisfied when the moving robot 100 is disposed in the front F2 of the docking device 200. In the preparation operation step S100, the moving robot 100 operates so that the first condition and the second condition are satisfied.

The docking operation step S200 is performed in a state where the first condition and the second condition are satisfied. In the docking operation step S200, the moving robot 100 moves to the front F1 and attempts to dock. When the moving robot 100 moves in the front direction F1 in a state where the front direction F1 of the moving robot 100 and the front direction F2 of the docking device 200 are disposed on the same straight line, docking can succeed.

Figure 8:
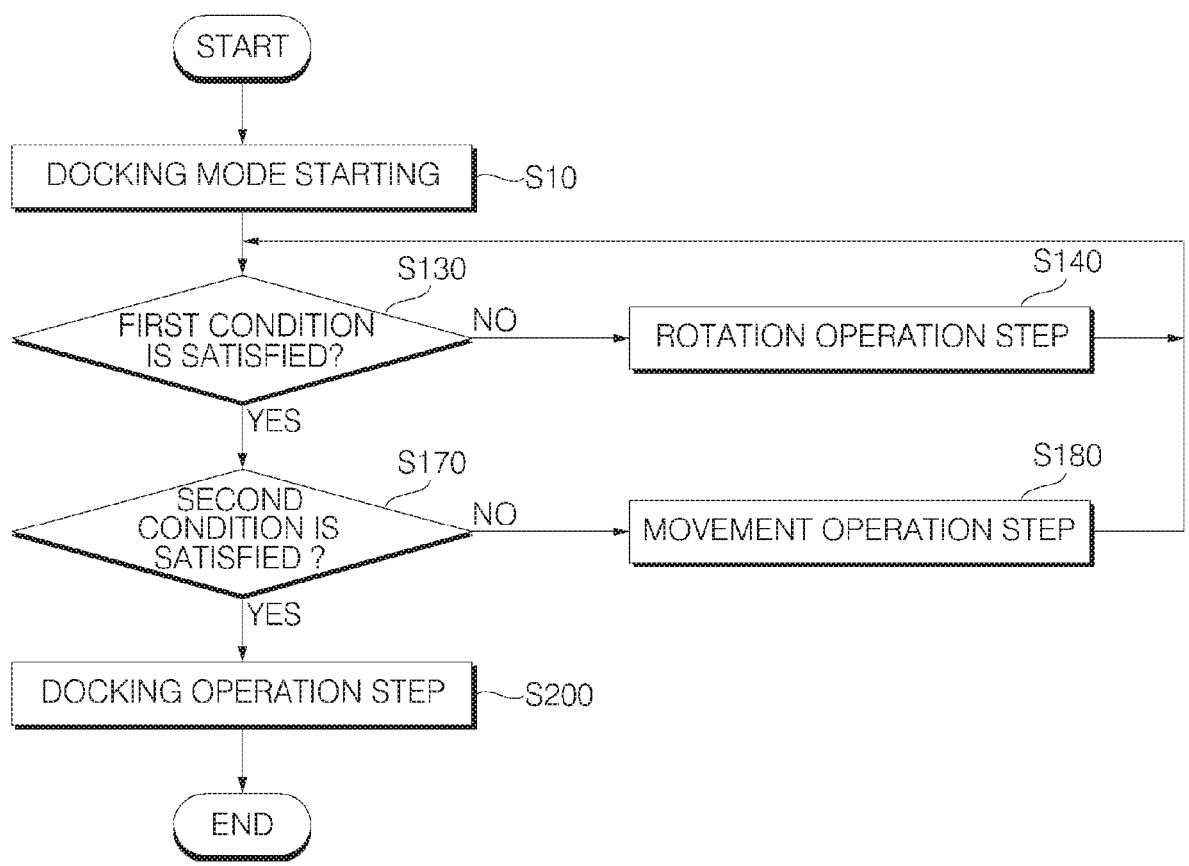
FIG. 8 is a flowchart illustrating the flowchart of FIG. 7 more specifically.

Referring to FIG. 8, the preparation operation step S100 will be described in more detail as follows. After the docking mode starting step S10, the preparation operation step S100 is performed.

After the docking mode starting step S10, the preparation operation step S100 includes a first determination step S130 of determining whether the first condition is satisfied.

The preparation operation step S100 includes a rotation operation step S140 that is performed when it is determined that the first condition is not satisfied. In the rotation operation step S140, the moving robot 100 may rotate in a specific rotation direction. In the rotation operation step S140, the moving robot 100 may perform an operation of rotating in place.

After the rotation operation step S140, the first determination step S130 is performed again. After the rotation operation step S140, the moving robot 100 determines again whether the first condition is satisfied.

The preparation operation step S100 includes a second determination step S170 for determining whether the second condition is satisfied. It is determined whether the second condition is satisfied in a state where the first condition is satisfied. In the first determination step S130, when it is determined that the first condition is satisfied, the second determination step S170 is performed.

The preparation operation step S100 includes a movement operation step S180 that is performed when it is determined that the second condition is not satisfied. In the movement operation step S180, the moving robot 100 may move in a specific movement direction. For example, in the movement operation step S180, the moving robot may rotate in place so that the specific moving direction becomes the front direction F1, and then move forward by a certain distance. After moving forward, the moving robot 100 may rotate in place to see the docking device 200 in a front direction F1.

After the movement operation step S180, the first determination step S130 is performed again. After the movement operation step S180, the moving robot 100 determines again whether the first condition is satisfied.

In the second determination step S170, when it is determined that the second condition is satisfied, the docking operation step S200 is performed.

Figure 9:
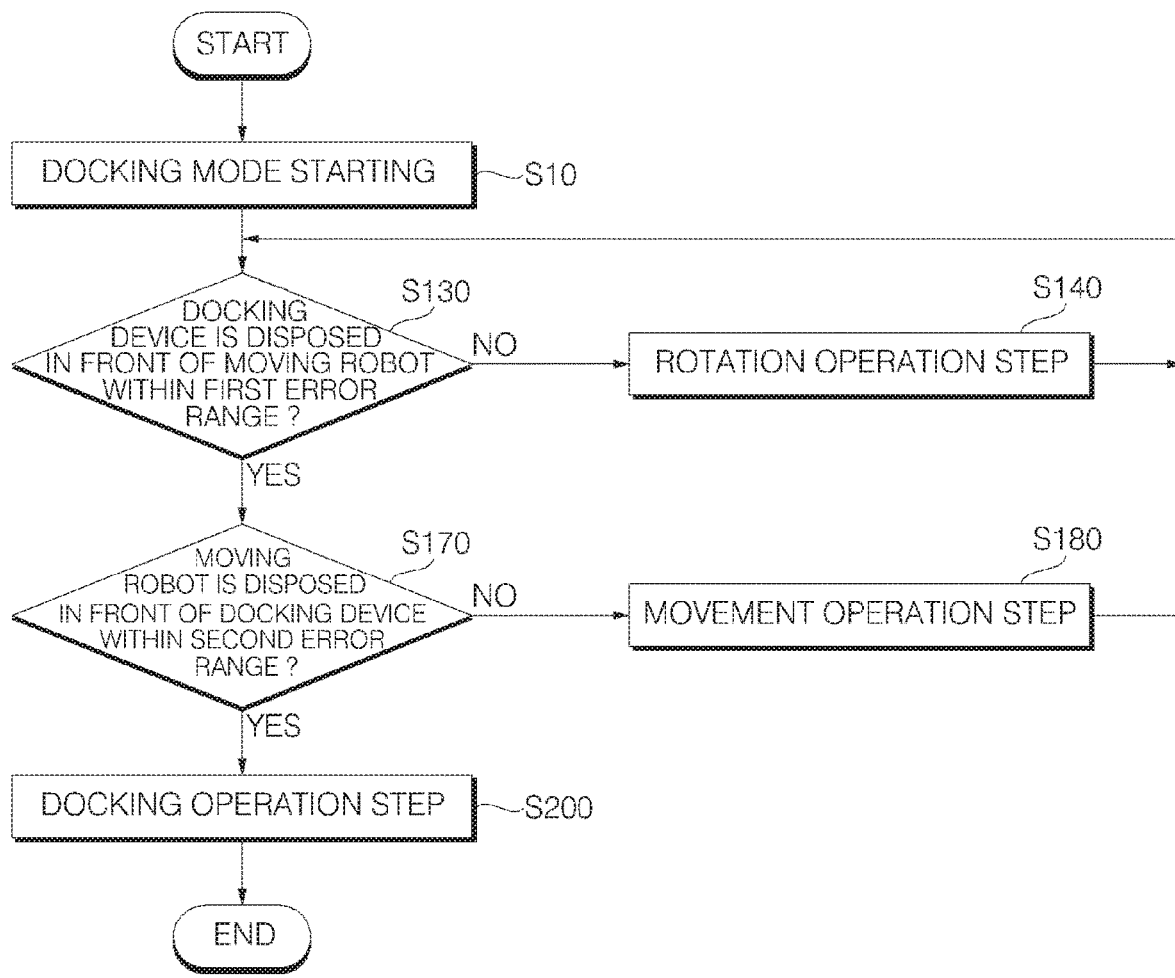
FIG. 9 is a flow chart implementing the technical meaning in the flowchart of FIG. 8.

Referring to FIG. 9, a fact that the first condition is satisfied when the docking device 200 is disposed in the front direction F1 of the moving robot 100 means that the docking device 200 is disposed within a certain error range of the front direction F1 of the moving robot 100. The error range of the first condition may be referred to as a first error range.

The first error range may be set to a certain angle range based on the front direction F1 of the moving robot 100. If the center of the marker 220 of the docking device 200 in the left-right direction is disposed in the first error range based on the front direction F1 of the moving robot 100, the first condition may be satisfied.

It is preferable that the center of the marker 220 in the left-right direction is positioned in the center of a disposition area in the left-right direction when the moving robot 100 is docked in the docking device 20.

For example, the first error range may be preset to a specific value within ±2 degrees based on the front direction F1 of the moving robot 100. In the present embodiment, the first error range is preset to ±0.7 degrees based on the front direction F1 of the moving robot 100.

Specifically, in the first determination step S130, it is determined whether the docking device 200 is disposed in the front F1 of the moving robot 100 within the first error range. When the docking device 200 is not disposed in the front F1 of the moving robot 100 within the first error range, the rotation operation step S140 is performed. When the docking device 200 is disposed in the front F1 of the moving robot 100 within the first error range, the second determination step S170 is performed.

A fact that the second condition is satisfied when the moving robot 100 is disposed in the front direction F2 of the docking device 200 means that the moving robot 100 is disposed within a certain error range of the front direction F2 of the docking device 200. The error range of the second condition may be referred to as a second error range.

The second error range may be set to a certain angle range based on the front direction F2 of the docking device 200. The second condition may be satisfied when the center of the front portion of the moving robot 100 in the left-right direction is disposed in the second error range based on the front direction F2 of the docking device 200. It is preferable that the 3D sensor 135 is disposed in the center of the front portion of the moving robot 100 in the left-right direction. Specifically, it is preferable that the light irradiation unit 135a irradiates light forward from the center in the left-right direction of the front portion of the moving robot 100, and the 3D camera 135b senses the forward image at the center in the left-right direction of the front portion of the moving robot 100.

For example, the second error range may be preset to a specific value within ±10 degrees based on the front direction F2 of the docking device 200. In the present embodiment, the second error range is preset to ±9 degrees based on the front direction F2 of the docking device 200.

Specifically, in the second determination step S170, it is determined whether the moving robot 100 is disposed in the front F2 of the docking device 200 within the second error range. When the moving robot 100 is not disposed in the front F2 of the docking device 200 within the second error range, the movement operation step S180 is performed. When the moving robot 100 is disposed in the front F2 of the docking device 200 within the second error range, the docking operation S200 is performed.

Figure 10:
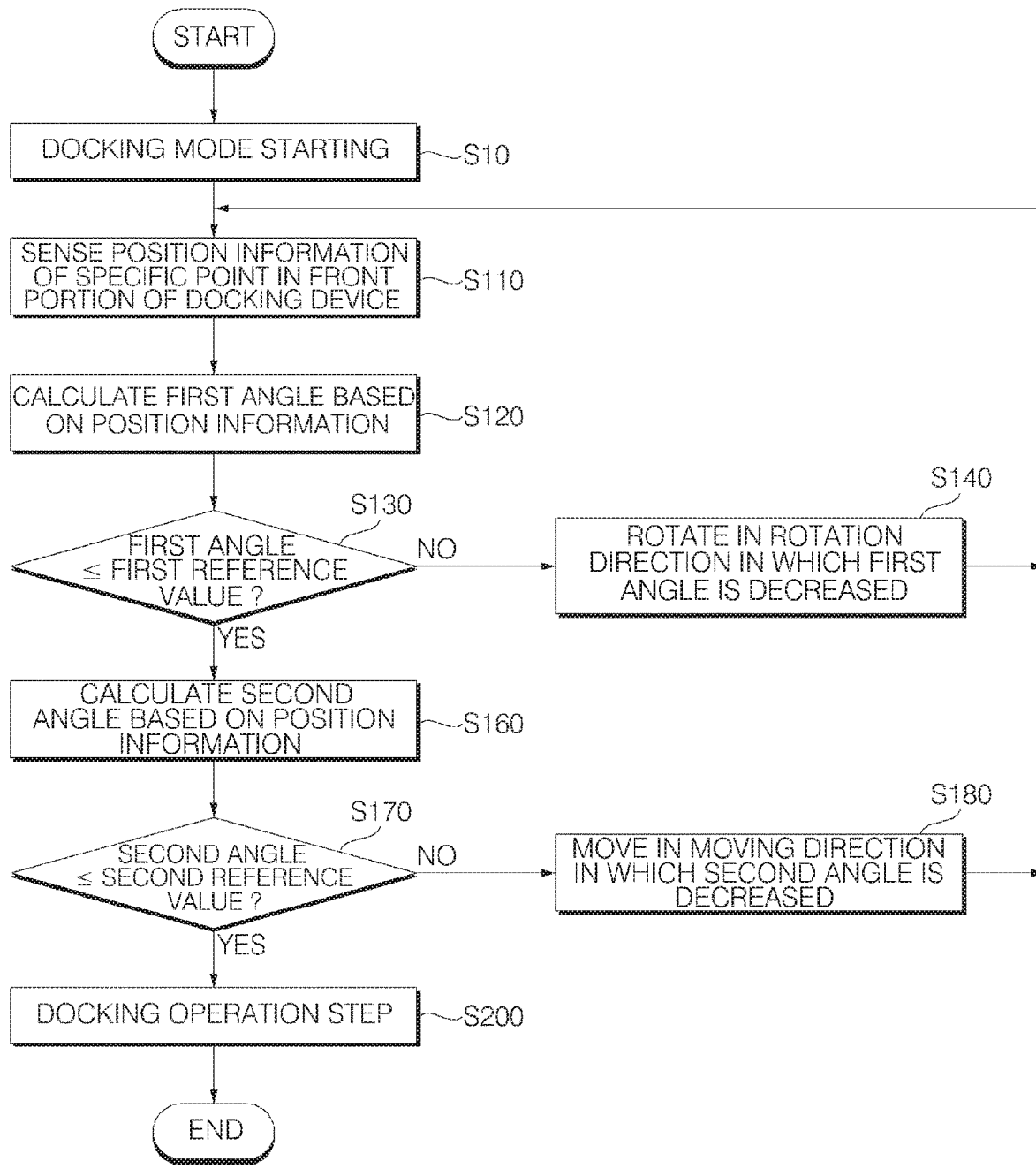
FIG. 10 is a flow chart implementing the technical means in the flowchart of FIG. 8.

Referring to FIG. 10, the preparation operation step S100 is performed based on the position information of at least two specific points horizontally spaced apart in the front portion of the docking device 200 sensed by the moving robot 100.

The preparation operation step S100 includes a sensing step S110 of sensing position information of the specific point in the front portion of the docking device 200, after the docking mode starting step S10.

The preparation operation step S100 includes a first angle calculation step S120 of calculating the first angle A1 based on the position information of the specific point, after the sensing step S110.

After the first angle calculation step S120, the first determination step S130 is performed. In the first determination step S130, the first angle A1 is compared with a certain first reference value S1 to determine whether the first condition is satisfied.

The first condition may be preset to a condition that the first angle A1 is equal to or less than a certain first reference value S1. Alternatively, the first condition may be preset to a condition that the first angle A1 is less than a certain first reference value S1. It is possible to increase the docking success rate and the operation efficiency of the moving robot 100 by determining whether the moving robot 100 is rotated based on the first angle.

For example, the first reference value S1 may be preset to a specific value within 2 degrees. In the present embodiment, the first reference value S1 is preset to 0.7 degrees. The level of permitting the first error range is determined by the first reference value S1.

In the rotation operation step S140, the moving robot 100 rotates in the rotation direction Rd in which the first angle A1 is decreased. In the rotation operation step S140, the moving robot 100 is controlled to rotate by the first angle A1 in the rotation direction Rd.

After the rotation operation step S140, the sensing step S110 and the first angle calculation step S120 are performed again.

When it is determined that the first condition is satisfied, the second angle calculation step S160 is performed. Without needing to be limited thereto, the second angle calculation step S160 may be performed at any point of time before the second determination step S170 after the sensing step S110.

When it is determined that the first condition is satisfied, the second determination step S170 is performed. In the second determination step S170, the second angle A2 is compared with a certain second reference value S2 to determine whether the second condition is satisfied.

The second condition may be preset to a condition that the second angle A2 is equal to or less than a certain second reference value S2. Alternatively, the second condition may be preset to a condition that the second angle A2 is less than a certain second reference value S2. It is possible to increase the docking success rate and the operation efficiency of the moving robot 100 by determining whether to start the entry operation for docking of the moving robot based on the second angle.

For example, the second reference value S2 may be preset to a specific value within 10 degrees. In the present embodiment, the second reference value S2 is preset to 9 degrees. The level of permitting the second error range is determined by the second reference value S2.

In the movement operation step S180, the moving robot moves in the moving direction Md in which the second angle A2 is decreased. In the movement operation step S180, the moving robot 100 is controlled to move in the moving direction Md by a second distance Dd calculated according to a certain algorithm.

After the movement operation step S180, the sensing step S110 and the first angle calculation step S120 are performed again.

When it is determined that the second condition is satisfied, the docking operation step S200 is performed. In the docking operation step S200, the moving robot 100 moves to the front (Mt).

Hereinafter, a process for calculating the first angle A1 and the second angle A2 for each embodiment will be described with reference to FIGS. 11A to 12C. A vertical auxiliary line Lf corresponding to the front direction F1 of the moving robot 100 is shown on a screen of the 3D camera of FIGS. 11A to 12C.

The controller 140 may determine whether the first condition is satisfied based on position information of at least one specific point of the front portion of the docking device 200 sensed by the sensing unit 130. Preferably, the controller 140 may determine whether the first condition is satisfied, based on position information of at least one specific point disposed at the center in the left-right direction of the front portion of the docking device 200. In the first embodiment referring to FIGS. 11A to 11C, the controller 140 determines whether the first condition is satisfied, based on the position information of the specific point P3 disposed at the center in the left-right direction of the front portion of the docking device 200. In the second embodiment referring to FIGS. 12A to 12C, the controller 140 determines whether the first condition is satisfied, based on the position information of the specific point Pc disposed at the center in the left-right direction of the front portion of the docking device 200.

The controller 140 may determine whether the second condition is satisfied, based on the position information of at least two specific points spaced in the horizontal direction of the front portion of the docking device 200 sensed by the sensing unit 130. In the first embodiment referring to FIGS. 11A to 11C, the controller 140 determines whether the second condition is satisfied, based on the position information of two specific points P1 and P2 spaced in the horizontal direction of the front portion of the docking device 200. In the second embodiment referring to FIGS. 12A to 12C, the controller 140 determines whether the second condition is satisfied, based on the position information of two specific points Q1 and Q2 spaced in the horizontal direction and two specific points Q3 and Q4 spaced in the horizontal direction of the front portion of the docking device 200.

Hereinafter, referring to FIGS. 11A to 11C, based on the sensing result of the 3D sensor 135 according to the first embodiment, the process of controlling the moving robot 100 will be described. The reflected light LR is sensed from the image acquired by the 3D camera 135b of FIGS. 11A to 11C. The reflected light LR is a light, which is irradiated from the light irradiation unit 135a, that reached the docking device 200 in a pattern that horizontally crosses the marker 220 and then is reflected. At this time, among the sensed reflected light LR, the light l(220a), l(220b) reflected by the marker 220 is remarkably bright. Thus, the moving robot 100 may recognize the boundary of the marker 220. The two specific points P1 and P2 are selected from the boundary points of the marker 220. In the present embodiment, based on the moving robot 100, the specific point P1 is set to the right boundary point of the light l(220b) reflected on the second portion 220b, and the specific point P2 is set to the left boundary point of the light (1220a) reflected on the first portion 220a.

The two specific points P1 and P2 are horizontally spaced from each other. The specific point P1 and the specific point P2 may be set to a point which is symmetrical based on the center of the front portion in the left-right direction of the docking device 200.

Referring to FIG. 11A, a process of calculating the first angle A1 for determining whether the first condition is satisfied will be described. Relative position information of the specific point P1, P2 may be recognized by the reflected light sensed by the 3D camera 135b. The relative position information may include information on distance and direction. For example, the information on direction may be recognized based on the moving robot 100, through the position in the left-right direction of the specific points P1 and P2 on the screen of the 3D camera 135b. For example, distance information on the specific point P1, P2 may be recognized based on the moving robot 100 through the TOF method. Accordingly, the coordinate information (x1, y1) of the specific point P1 and the coordinate information (x2, y2) of the specific point P2 may be calculated on a two-dimensional X-Y coordinate system in which the position of the moving robot 100 is set to origin O(0,0), the front direction F1 of the moving robot 100 is set to Y axis, and the left-right direction of the moving robot 100 is set to X axis.

Here, the origin O(0, 0) may be preset to a position on a horizontal plane on which the 3D camera 135b is disposed, or may be preset to a position on a horizontal plane serving as a rotation center when the moving robot 100 performs a rotation operation. The TOF method is performed based on the position where the 3D camera 135b is disposed. When there is a difference between the position of the origin O(0,0) and the position of the 3D camera 135b, the coordinate information of the specific point may be calculated by correcting such a position difference and the coordinate information of the specific point may be calculated by ignoring such a position difference as an error range. In the present embodiment, although a difference between the position of the origin O(0,0) and the position of the 3D camera 135b is generated, since the error range is considered with respect to the first condition and the second condition, there is no problem in performing the method.

The disposition direction D1 is preset to the disposition direction of the specific point P3 with respect to the moving robot 100. The specific point P3 is disposed in the center in the left-right direction of the marker 220. The specific point P3 may be preset to a midpoint between the specific point P1 and the specific point P2.

The moving robot 100 calculates the coordinate information (x3, y3) of the specific point P3.

For example, the coordinate information (x3, y3) of the specific point P3 may be calculated by using the coordinate information (x1, y1) and the coordinate information (x2, y2). The specific calculation equation is $x3=(x1+x2)/2$ and $y3=(y1+y2)/2$.

As another example, the position of the specific point P3 may be immediately recognized in the image of the 3D camera, so that the coordinate information (x3, y3) of the specific point P3 may be calculated immediately without using the coordinate information (x1, y1) and the coordinate information (x2, y2).

The first angle A1 may be calculated according to the following Equation 1 through the coordinate information (x3, y3) of the specific point P3.

$$A1 = \tan^{-1} \frac{y3}{x3} \quad \text{[Equation 1]}$$

In the example of FIG. 11A, it is determined that the calculated first angle A1 is larger than the first reference value S1, so that the moving robot 100 rotates about the origin O by the first angle A1 in the rotation direction Rd.

Referring to FIG. 11 B, after rotating, the moving robot 100 calculates again the coordinate information (x3', y3') of the specific point P3 in the current state. Accordingly, when it is determined that the first condition is satisfied by calculating the first angle again, the process of calculating the second angle A2 may be performed. The moving robot 100 acquires again the coordinate information (x1', y1') of the specific point P1 and the coordinate information (x2', y2') of the specific point P2 in the current state. Based on the coordinate information of the two specific points P1 and P2, an example of the process of calculating the second angle A2 for determining whether the second condition is satisfied is as follows.

Firstly, a slope of the straight line L1 passing through the specific points P1 and P2 on the two-dimensional X-Y coordinate system may be acquired by using the coordinate information (x1', y1') and the coordinate information (x2', y2'). In the two-dimensional X-Y coordinate system, a straight line passing through the specific point P3 and extending in the front direction of the docking device 200 is defined as L2. Since the slope of the straight line L2 is an inverse number of the slope of the straight line L1 and the straight line L2 passes through the coordinate (x3', y3') of the specific point P3, equation of the straight line L2 may be acquired from the two-dimensional X-Y coordinate system. Further, by using a known equation, the length Dd of a line perpendicular to the straight line L2 at the origin O may be acquired by using the equation of the straight line L2 and the coordinate(0, 0) of the origin O. Further, the distance ($\overline{OP3}$) from the origin O to the specific point P3 may be acquired. Accordingly, the second angle A2 may be calculated by the following Equation 2.

$$A2 = \sin^{-1} \frac{Dd}{\overline{OP3}} \quad \text{[Equation 2]}$$

In the example of FIG. 11 B, it is determined that the calculated second angle A2 is larger than the second reference value S2, and the moving robot 100 moves by a second distance Dd in the moving direction Md. Specifically, the moving robot 100 moves forward by the second distance Dd after rotating 90-A2 degrees in the counterclockwise direction in place in the state of FIG. 11 B, and then rotates 90 degrees in the clockwise direction in place.

Referring to FIG. 11C, after the moving robot 100 is moved, it is determined whether the first condition and the second condition are satisfied, by calculating the coordinate information (X1", y1"), (X2", y2"), (x3", y3") of the specific points P1, P2 and P3 in the current state. In the example of FIG. 11C, it is determined that the first condition and the second condition are satisfied, and the moving robot 100 moves in the front direction F1 and performs the entry operation Mt of attempting to dock.

Hereinafter, referring to FIGS. 12A to 12C, based on the sensing result of the 3D sensor 135 according to the second embodiment, the process of controlling the moving robot 100 will be described. The reflected light LR is sensed from the image acquired by the 3D camera 135b of FIGS. 12A to 12C. The reflected light LR is a light, which is irradiated from the light irradiation unit 135a, that reached an area including the marker 220 and then is reflected. At this time, among the sensed reflected light LR, the light l(220a), l(220b) reflected by the marker 220 is remarkably bright. Thus, the moving robot 100 can recognize the boundary of the marker 220. The four specific points Q1, Q2, Q3, Q4 are selected from the boundary points of the marker 220. In the present embodiment, based on the moving robot 100, the specific point Q1 is set to an upper left boundary point of the light l(220b) reflected on the second portion 220b, the specific point Q2 is set to a lower left boundary point of the light l(220b) reflected on the second portion 220b, the specific point Q3 is set to an upper right boundary point of the light l(220a) reflected on the first portion 220a, and the specific point Q4 is set to a lower right boundary point of the light l(220a) reflected on the first portion 220a.

Any two specific points Q1 and Q3 and the other two specific points Q2 and Q4 among the four specific points Q1, Q2, Q3 and Q4 are horizontally spaced from each other. The specific point Q1 and the specific point Q2 may be preset to a point which is symmetrical based on the center in the left-right direction of the front portion of the docking device 200. The specific point Q3 and the specific point Q4 may be preset to a point which is symmetrical based on the center in the left-right direction of the front portion of the docking device 200. One Q1 of any two specific points Q1 and Q3 and the other one Q3 are spaced apart from each other in the vertical direction. One Q2 of the other two specific points Q2 and Q4 and the other one Q4 are spaced apart from each other in the vertical direction.

A process of calculating the first angle A1 for determining whether the first condition is satisfied will be described with reference to FIG. 12A. The moving robot 100 may recognize the specific point Pc through a relative positional relationship in the image with respect to the four specific points Q1, Q2, Q3, and Q4. The disposition direction D1 is previously set to a disposition direction of the specific point PC with respect to the moving robot 100. The specific point PC is disposed in the center of the marker 220 in the left-right direction. The specific point Pc may be preset within a mid area between the first portion 220a and the second portion 220b.

The relative position information of the specific point Pc may be recognized by the reflected light sensed by the 3D camera 135b. The relative position information may include information on distance and direction. For example, information on the direction may be recognized based on the moving robot 100 through a position in the left-right direction of the specific point Pc on the screen of the 3D camera 135b. For example, the distance information dc for the specific point Pc may be recognized based on the moving robot 100, through the TOF method. Further, in the image acquired by the 3D camera 135b, the distance information dx in which the specific point Pc is spaced in the left-right direction from the vertical auxiliary line Lf corresponding to the front direction F1 may be recognized. Accordingly, the coordinate information (x, y) of the specific point Pc may be calculated from a two-dimensional X-Y coordinate system in which the position of the moving robot 100 is set as an origin O(0,0), the front direction F1 of the moving robot 100 is set as a Y axis, and the left-right direction of the moving robot 100 is set as a X axis.

Here, the description related to the positional difference between the origin O(0, 0) and the 3D camera 135b is the same as above explanation.

The first angle A1 may be calculated according to the following Equation 3 through the coordinate information (x, y) of the specific point Pc.

$$A1 = \tan^{-1} \frac{y}{x} \quad \text{[Equation 3]}$$

In the example of FIG. 12A, it is determined that the calculated first angle A1 is larger than the first reference value S1, and the moving robot 100 rotates around the origin O by the first angle A1 in the rotation direction Rd.

Referring to FIG. 12B, after the moving robot 100 rotates, the coordinate information (x', y') of the specific point Pc is calculated again in the current state. Accordingly, when it is determined that the first condition is satisfied by calculating the first angle again, the process of calculating the second angle (A2) may be performed.

The moving robot 100 acquires at least four specific points Q1, Q2, Q3, and Q4 of the front potion of the docking device 200 from an image of the front portion of the docking device 200 that the 3D camera 135b photographed. It is determined whether the second condition is satisfied based on the position information of the four specific points Q1, Q2, Q3, Q4.

More specifically, the moving robot 100 acquires the coordinate information of the at least four specific points Q1, Q2, Q3, and Q4 of the front potion of the docking device 200 from the image of the front portion of the docking device 200 that the moving robot photographed. On a two-dimensional p-q coordinate system in which the left-right direction is set as a p axis and the vertical direction is set as a q axis in the photographed image, the coordinate information (p1', q1'), (p2', q2'), (p3', q3'), and (p4', q4') of the four specific points Q1, Q2, Q3, Q4 may be calculated. That is, the two-dimensional X-Y coordinate system of the coordinate information of the specific point Pc and the coordinate information two-dimensional p-q coordinate system of the four specific points Q1, Q2, Q3 and Q4 are different from each other. An example of a process of determining whether the second condition is satisfied based on the coordinate information of the at least four specific points Q1, Q2, Q3, and Q4 of the front portion of the docking device 200 is as follows.

The distance $\overline{Q1Q3}$ between the specific points Q1 and Q3 on the two-dimensional p-q coordinate system can be acquired by using the coordinate information (p1', q1') of the specific point Q1 and the coordinate information (p3', q3') of the specific point Q3. The distance $\overline{Q2Q4}$ between the specific points Q2 and Q4 on the two-dimensional p-q coordinate system can be acquired by using the coordinate information (p2', q2') of the specific point Q2 and the coordinate information (p4', q4') of the specific point Q4.

As the second angle A2 increases, a difference between the distance i) from the 3D camera 135b to the specific point Q1, Q3 on the front portion of the docking device 200 and the distance ii) from the 3D camera 135b to the specific point Q2, Q4 on the front portion of the docking device 200 becomes larger. Accordingly, a difference between the distance $\overline{Q1Q3}$ and the distance $\overline{Q2Q4}$ becomes larger. When the second angle A2 becomes 0, the ratio of the distance $\overline{Q1Q3}$ to the distance $\overline{Q2Q4}$ becomes 1:1. The relationship between i) the magnitude of the second angle A2 and the ii) ratio of the distance $\overline{Q2Q4}$ to the distance $\overline{Q1Q3}$ may be mathematically or experimentally previously set. Thus, the second angle A2 is calculated based on the ratio of the distance $\overline{Q2Q4}$ to the distance $\overline{Q1Q3}$.

When the distance $\overline{Q2Q4}$ is larger than the distance $\overline{Q1Q3}$, it is determined that the moving robot 100 is disposed in a position shifted in the counterclockwise direction from the front direction F2 of the docking device 200 (See FIG. 12B). In addition, when the distance $\overline{Q2Q4}$ is smaller than the distance $\overline{Q1Q3}$, it is determined that the moving robot 100 is disposed in a position shifted in the clockwise direction from the front direction F2 of the docking device 200.

In the example of FIG. 12B, it is determined that the calculated second angle A2 is larger than the second reference value S2, and the moving robot 100 moves by the second distance Dd in the moving direction Md. A specific example of this operation is the same as the description of the first embodiment. Meanwhile, as the distance information dx and the coordinate information (x, y) of the specific point Pc are changed according to the rotation operation of the moving robot, corresponding information is expressed as dx', x', and y' in FIG. 12B. In addition, as the coordinate information of the four specific points Q1, Q2, Q3, and Q4 is changed in the acquired image according to the rotation operation of the moving robot, the coordinate information of the four specific points Q1, Q2, Q3, and Q4 is expressed as (P1', q1') (p2', q2') (p3', q3'), and (p4', q4') in FIG. 12B, respectively.

Referring to FIG. 12C, after the moving robot 100 is moved, coordinate information (x", y") of the specific point Pc is calculated in the current state, and it is determined whether the first condition is satisfied. In addition, it is determined whether the second condition is satisfied, by calculating the coordinate information (p1", q1") (p2", q2"), (p3", q3"), and (p4", q4") of the specific points Q1, Q2, Q3, and Q4 in the current state of the moving robot 100. In the example of FIG. 11C, it is determined that the first condition and the second condition are satisfied, and the moving robot 100 performs the entry operation Mt of moving in the front direction F1 and attempting to dock.

Meanwhile, although not shown, the docking device 200 may transmit a separate signal, and the moving robot 100 receives a signal transmitted from the docking device 200, so that the received signal can be referred to the control during the rotation operation and the movement operation. For example, the docking device 200 transmits a signal which is changed depending on the disposition direction D2 of the moving robot 100 with respect to the docking device 200, and this signal may help in determining a point of movement completion when the docking device 200 performs movement. For example, the docking device 200 transmits a signal which is changed depending on the distance of the moving robot 100 with respect to the docking device 200, which may help in docking accurately when the docking device 200 performs the entry operation Mt.

As described above, according to the present invention, the moving robot may perform the entry operation in a state where the moving robot and the docking device face each other, and the docking success rate of the moving robot may be increased without a docking induction signal.

Further, the first condition and the second condition are previously set, and an appropriate level of preparation operation is performed before the entry operation for docking of the moving robot, thereby increasing the efficiency of the preparation operation for docking as well as the docking success rate.

Further, it is determined whether the second condition is satisfied in a state where the first condition is satisfied, so that the second angle can be calculated more easily and accurately in a state where the docking device is disposed in the front direction of the moving robot.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

What is claimed is:

1. A moving robot comprising:
    a main body;
    a traveling unit configured to rotate and move the main body;
    a sensing unit configured to sense position information of a specific point of a front portion of a docking device, wherein the sensing unit comprises:
        a light irradiation unit for irradiating a certain light; and
        a 3D camera for sensing the irradiated light reflected from the specific point; and
    a controller configured to, based on a sensing result of the sensing unit, determine i) whether a first condition, which is preset to be satisfied when the docking device is disposed in a front of the moving robot, is satisfied, and ii) whether a second condition, which is preset to be satisfied when the moving robot is disposed in a front of the docking device, is satisfied, to control an operation of the traveling unit so as to satisfy the first condition and the second condition, and to move to the front so as to attempt to dock in a state where the first condition and the second condition are satisfied,
    wherein the controller is further configured to:
        determine whether the first condition is satisfied, based on position information of at least one specific point of the front portion of the docking device sensed by the sensing unit,
        determine whether the second condition is satisfied, based on position information of at least two specific points spaced apart in a horizontal direction of the front portion of the docking device sensed by the sensing unit,
        determine whether the second condition is satisfied, based on relative position information of the two specific points with respect to the moving robot, and
        determine whether the second condition is satisfied, based on position information of at least four specific points in the front portion of the docking device, from an image of the front portion of the docking device photographed by the 3D camera,
    wherein, among the two specific points, one specific point and the other one specific point are horizontally spaced from each other, and wherein, among the other two specific points, one specific point and the other one specific point are vertically spaced from each other, and the controller further is configured to determine whether the second condition is satisfied, based on position information of at least two specific points spaced apart in a vertical direction of the front portion of the docking device sensed by the sensing unit and position information of at least two specific points spaced apart in a horizontal direction of the front portion of the docking device sensed by the sensing unit, and
    wherein the controller is further configured to determine whether the second condition is satisfied in a state where the first condition is satisfied.

2. The moving robot of claim 1, wherein the controller is configured to control the moving robot to rotate in a rotation direction in which a first angle between a front direction of the moving robot and a disposition direction of the docking device with respect to the moving robot is decreased, when it is determined that the first condition is not satisfied, and
    the controller is configured to control the moving robot to move in a moving direction in which a second angle between a front direction of the docking device and a disposition direction of the moving robot with respect to the docking device is decreased, when it is determined that the second condition is not satisfied.

3. The moving robot of claim 1, wherein the controller is configured to calculate a first angle between a front direction of the moving robot and a disposition direction of the docking device with respect to the moving robot,
    and the controller is configured to determine whether the first condition is satisfied based on the first angle.

4. The moving robot of claim 3, wherein the controller is configured to preset the first condition to a condition that the first angle is equal to or less than a certain first reference value.

5. The moving robot of claim 3, wherein the controller is configured to control the moving robot to rotate by the first angle in a rotation direction in which the first angle is decreased, when it is determined that the first condition is not satisfied.

6. The moving robot of claim 1, wherein the controller is configured to calculate a second angle between a front direction of the docking device and a disposition direction of the moving robot with respect to the docking device, and determine whether the second condition is satisfied based on the second angle.

7. The moving robot of claim 6, wherein the controller is configured to preset the second condition to a condition that the second angle is equal to or less than a certain second reference value.

8. The moving robot of claim 6, wherein the controller is configured to control the moving robot to move by a second distance calculated according to a certain algorithm in a moving direction in which the second angle is decreased, when it is determined that the second condition is not satisfied.

9. A method of controlling a moving robot for an operation for docking to a docking device, the method comprising:
    a preparation operation step of determining, based on a result of position information of a specific point in a front portion of the docking device that the moving robot sensed, i) whether it satisfies a first condition which is preset to be satisfied when the docking device is disposed in a front of the moving robot, and ii) whether it satisfies a second condition which is preset to be satisfied when the moving robot is disposed in a front of the docking device; and
    a docking operation step of moving to the front and attempting to dock, by the moving robot, in a state where the first condition and the second condition are satisfied, wherein the preparation operation step comprises:
determining whether the first condition is satisfied, based on a result, sensed by the moving robot, of a relative position, with respect to the moving robot, of at least one specific point of the front portion of the docking device,
determining whether the second condition is satisfied, based on a result, sensed by the moving robot, of a relative position, with respect to the moving robot, of at least two specific points spaced apart on the front portion of the docking device,
determining whether the second condition is satisfied based on position information of at least four specific points in the front portion of the docking device, from an image of the front portion of the docking device photographed by the moving robot,
wherein, among the four specific points, two specific points and the other two specific points are horizontally spaced from each other, and
wherein, among the two specific points, one specific point and the other one specific point are vertically spaced from each other, and
determining whether the second condition is satisfied, based on position information of at least two specific points spaced apart in a vertical direction of the front portion of the docking device sensed by the sensing unit and position information of at least two specific points spaced apart in a horizontal direction of the front portion of the docking device sensed by the sensing unit, and wherein the preparation operation step further comprises determining whether the second condition is satisfied when the first condition is satisfied, and determining again whether the first condition is satisfied after the movement operation step.

10. The method of claim 9, wherein the preparation operation step comprises:
a rotation operation step, which is performed when it is determined that the first condition is not satisfied, of rotating, by the moving robot, in a rotation direction in which a first angle between a front direction of the moving robot and a disposition direction of the docking device with respect to the moving robot is decreased; and
a movement operation step, which is performed when it is determined that the second condition is not satisfied, of moving, by the moving robot, in a moving direction in which a second angle between a front direction of the docking device and a disposition direction of the moving robot with respect to the docking device is decreased.

11. The method of claim 9, wherein the preparation operation step comprises determining again whether the first condition is satisfied after the rotation operation step.

* * * * *